United States Patent [19]

Robare

[11] Patent Number: 5,009,315

[45] Date of Patent: Apr. 23, 1991

[54] CONTAINER CARRIER

[76] Inventor: Douglas F. F. Robare, P.O. Box 172, Middlefield, Mass. 01243

[21] Appl. No.: 545,820

[22] Filed: Jun. 29, 1990

[51] Int. Cl.⁵ .................. B65D 33/02; B65D 30/22; B65D 5/46
[52] U.S. Cl. ................................ 206/427; 206/174; 383/35; 383/67
[58] Field of Search ............... 206/427, 430, 174, 196, 206/139; 383/38, 104, 35, 67

[56] References Cited

U.S. PATENT DOCUMENTS

| | | | |
|---|---|---|---|
| 3,300,120 | 1/1967 | McColgan | 383/67 X |
| 3,346,167 | 10/1967 | Schmidt | 206/427 X |
| 4,290,525 | 9/1981 | Sisson | 206/427 |
| 4,499,997 | 2/1985 | Swingly, Jr. | 206/427 X |
| 4,542,826 | 9/1985 | Adams | 206/403 X |
| 4,574,978 | 3/1986 | Hodges | 206/427 X |
| 4,706,805 | 11/1987 | Becher | 206/427 X |
| 4,738,363 | 4/1988 | Hudson | 206/427 |
| 4,765,476 | 8/1988 | Lee | 206/427 |
| 4,869,599 | 9/1989 | Allen | 383/38 |
| 4,877,128 | 10/1989 | Strickland | 383/38 X |

Primary Examiner—Paul T. Sewell
Assistant Examiner—Jacob K. Ackun, Jr.
Attorney, Agent, or Firm—Fishman, Dionne & Cantor

[57] ABSTRACT

A reusable container carrier for storing and carrying beverage cans and the like wherein said container comprises a flexible, clear plastic envelope with openable top and bottom flaps and a removable insert therein for dividing said container into equal volume compartments for storing and carrying said beverage cans and the like.

5 Claims, 2 Drawing Sheets

CONTAINER CARRIER

BACKGROUND OF THE INVENTION

The present invention relates in general to a new and useful device for storing and carrying containers. In particular, it relates to a reusable plastic receptacle for storing and transporting beverage cans and the like.

With the advent of diminished landfill space for the disposal of trash and the like, recycling of various items has become an important alternative. Of the many items that are now recycled, beverage cans, clear and colored glass containers and plastic containers are, at present, the most widely recycled. In the case of many such containers, such as beverage cans, said containers are not only recyclable, they are returnable for deposit money such as $.05/container.

As will be understood by those familiar with the return of recyclable containers for return of a deposit, the type, i.e. brand and number, of said containers being returned must be discerned by the receiving party. At present, this involves "eyeball" inspection and counting which can be time consuming and messy.

SUMMARY OF THE INVENTION

It is an object of the present invention to provide a reusable plastic container carrier for recyclable/returnable beverage cans and the like.

It is another object of the present invention to provide a plastic container for recyclable/returnable beverage cans and the like that presents instant inspection and counting of the containers being returned.

It is a further object of the present invention to provide a plastic container which may be easily cleaned after one or more uses.

It is a still further object of the present invention to provide a plastic container for storing and transporting returnable/recyclable containers which may be collapsed to a fairly flat condition.

The above and other objects and advantages of the present invention will become apparent from the following description when considered in conjunction with the accompanying drawings.

DETAILED DESCRIPTION OF THE PREFERRED EMBODIMENT

Figure 1:
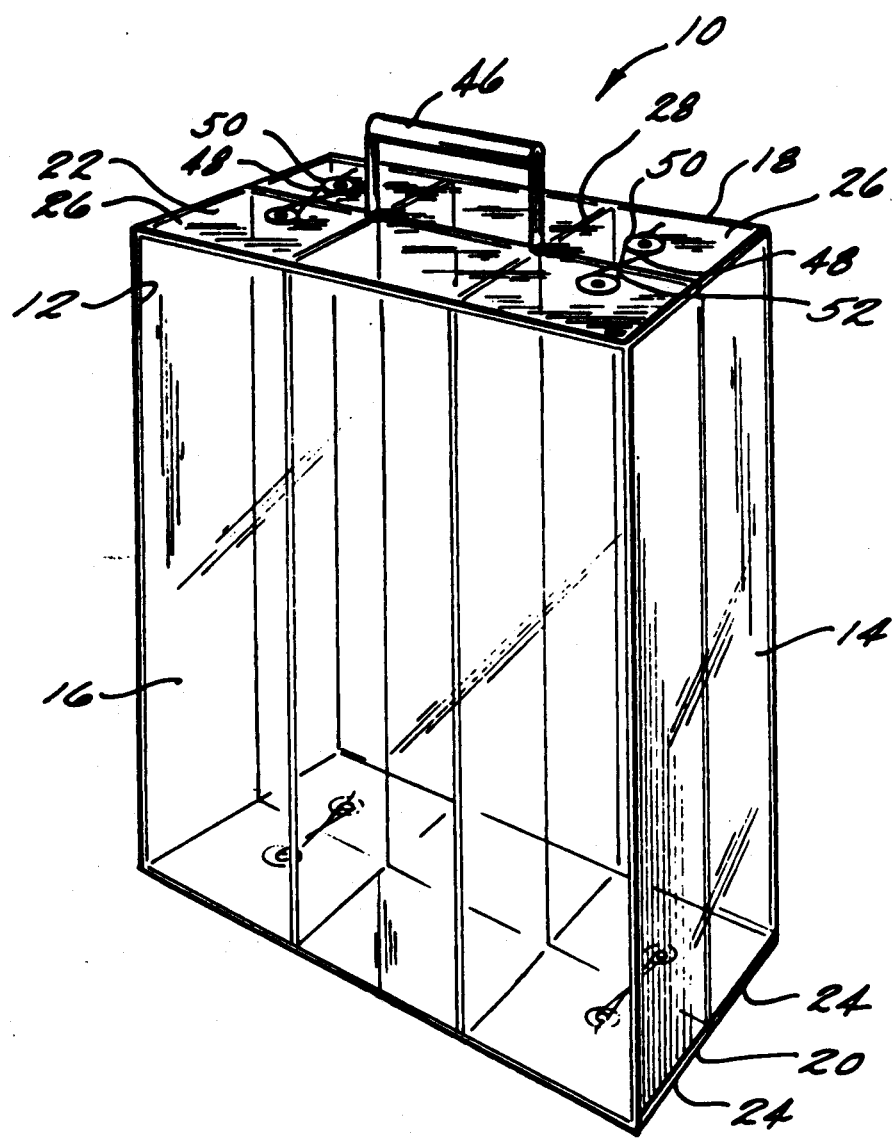
FIG. 1 is a perspective view of the container carrier of the present invention.

With reference to the drawings, the container carrier of the present invention is generally shown at 10. As will be noted, the container 10 is in the form of a generally rectangular shaped box having end walls 12 and 14 and side walls 16 and 18. The bottom 20 and top 22 of said container 10 comprise a pair of flaps 24 and 26 respectively which are hingedly disposed to the top and bottom edges of the side walls 16 and 18. Said flaps 24 and 26 may be separate from or an extension of said side walls 16 and 18.

The side walls 16 and 18, the end walls 12 and 14 and the top and bottom 22 and 20 may all be formed from flat sheets of plastic material which are flexible and resilient such as polyethylene and the like.

As shown, the container 10 is also provided with a divider insert 28 which in the embodiment shown divides the volume within the container 10 into 6 smaller but equal volumes which have a cross-sectional area sufficient to receive a beverage can or the like.

Figure 2:
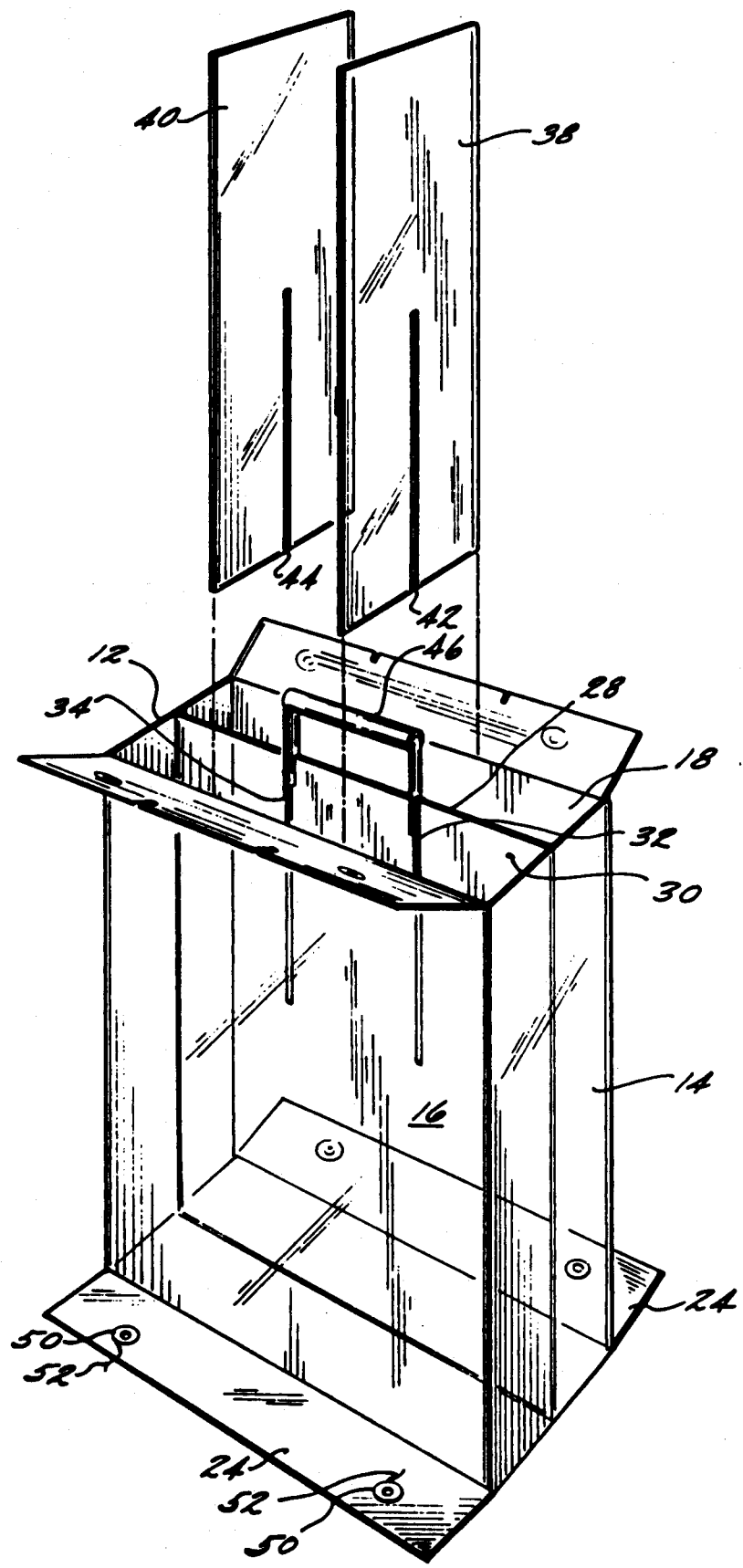
FIG. 2 is an exploded perspective view of the container carrier shown in FIG. 1.

As best seen in FIG. 2, the insert 28 is comprised of four elements. First is a rectangular shaped longitudinal partition 30 which is provided with slots 32 and 34 extending from the top edge 36 of the partition to a point just slightly in excess of half the depth of the partition 30. Rectangular shaped cross partitions 38 and 40 are also provided with slots 42 and 44 respectively, which extend from the bottom edge of each cross partition upward to a point just slightly in excess of half of the depth of said partitions 38 and 40. When the slots 42 and 44 of cross partitions 38 and 40 are mated with the slots 32 and 34 of the longitudinal partition 30 in crisscross fashion, said insert 28 is formed which when inserted into the container 10 divides the container into a plurality of equal volumes as described above.

Unlike the plastic material which is used to form the walls of the carrier 10, the partitions 30, 38 and 40 are preferably formed of rigid sheets of plastic such as polyethylene and the like. The rigid nature of the partitions 30, 38 and 40 gives shape and substance to the carrier 10.

With reference to FIGS. 1 and 2, it will also be seen that the longitudinal partition 30 is provided with a handle 46 in the form of a plastic loop. Said handle 46 is attached to the top edge of the longitudinal partition 30 at about the midpoint thereof. As shown in FIG. 1, said handle 46 extends upwardly out of the top of the carrier 10 between the flaps 26. Closure means 48 are provided on the top and bottom flaps 24 and 26. Said means are preferably in the form of plastic buttons or the like 50 which are secured by string 52. Said closure means, when in the closed position, permits the lifting of the carrier 10 by handle 46.

As should be clear to those skilled in the art, beverage cans and the like may be added to the carrier 10 by opening one or both of the top flaps 26 and inserting said cans in one of the equal volume compartments. As should also be clear, a carrier which is filled with cans may be easily and quickly unloaded by merely unlatching the bottom latch means and lifting the carrier so as to permit the bottom flaps 24 to fall open which allows the cans to fall out of the container 10. In addition, the carrier 10 may be flattened for storage by merely removing the insert 28 from the container 10, disjoining the cross partitions 38 and 40 from the longitudinal partition 30 and collapsing the walls of the container 10.

Although only a preferred embodiment of the container carrier has been specifically illustrated and described herein, it is to be understood that means variations may be made in the container carrier without departing from the spirit and scope of the invention. For example, the container carrier of the present invention may be sized so as to accommodate a divider insert which forms more or less than 6 equal volume compartments.

What is claimed is:

1. A container carrier for storing and transporting beverage cans and the like, said container comprising a box having a front wall, a back wall, two end walls, an openable bottom, an openable top, latch means associated with said top and with said bottom for holding said top and said bottom in a closed position, an insert disposed within said container for dividing the volume thereof into substantially equal portions and a handle for carrying said container disposed on said insert and extending from within said container to a point outside of said container, said openable top and openable bottom comprising a pair of flaps, one of said pair of flaps being hingedly connected to said front wall and the other of said pair of flaps being hingedly connected to said back wall, said box being made of a flexible, clear plastic material, said insert being made of a rigid plastic material.

2. The container of claim 1 wherein said insert comprises a longitudinal partition and at least one cross partition disposed perpendicular to said longitudinal partition.

3. The container of claim 2 wherein said longitudinal partition has at least one U-shaped slot therein extending from the top of said partition to a point just beyond the middle thereof and the cross partition has a U-shaped slot therein extending from the bottom thereof to a point just beyond the middle thereof whereby said U-shaped slots of each partition are engagable with one another in perpendicular orientation so as to form said insert.

4. The container of claim 1 wherein said divider comprises a longitudinal partition having a pair of U-shaped slots disposed therein extending from the bottom thereof to a point just beyond the middle thereof, a pair of cross partitions each having a U-shaped slot therein extending from the top of each cross partition to a point just beyond the middle thereof, said cross partitions being engagable with said longitudinal partition in perpendicular orientation at said U-shaped slots so as to form said insert.

5. The container of claim 3 wherein said handle is disposed on the top of said longitudinal partition and extends upwardly between said pair of flaps.

* * * * *